United States Patent
Besserer et al.

(10) Patent No.: US 6,863,188 B2
(45) Date of Patent: Mar. 8, 2005

(54) UNIVERSAL INSTALLATION KIT FOR A BUILT-IN UNIT FOR INSTALLATION IN A RACK

(75) Inventors: Horst Besserer, Herborn (DE); Achim Bührle, Möglingen (DE)

(73) Assignee: Rittal GmbH & Co. KG, Herborn (DE)

( * ) Notice: Subject to any disclaimer, the term of this patent is extended or adjusted under 35 U.S.C. 154(b) by 0 days.

(21) Appl. No.: 10/299,984

(22) Filed: Nov. 19, 2002

(65) Prior Publication Data

US 2003/0161134 A1 Aug. 28, 2003

(30) Foreign Application Priority Data

Nov. 19, 2001 (DE) .......................................... 101 56 931

(51) Int. Cl.⁷ ................................................ A47F 7/00
(52) U.S. Cl. ..................... 211/183; 211/26; 211/175; 312/223.1; 361/825
(58) Field of Search ................ 211/183, 175, 211/26, 187, 190–192, 207, 151; 361/825, 826, 829, 727; 248/200.1, 220.21, 220.22, 228.1, 243; 312/223.1, 223.2, 334.4, 334.5, 265.1, 265.2, 265.3, 265.4, 265.5

(56) References Cited

U.S. PATENT DOCUMENTS

| 3,986,318 | A | * | 10/1976 | McConnell ................. 403/384 |
| 4,129,279 | A | * | 12/1978 | Burkholder ................. 248/165 |
| 5,571,256 | A | * | 11/1996 | Good et al. ..................... 211/26 |
| 5,833,337 | A | * | 11/1998 | Kofstad .................... 312/334.5 |
| 5,938,302 | A | * | 8/1999 | Anderson et al. ........ 312/223.1 |
| 6,070,957 | A | * | 6/2000 | Zachrai .................... 312/334.4 |
| 6,190,081 | B1 | * | 2/2001 | Besserer et al. ............ 403/231 |
| 6,273,534 | B1 | * | 8/2001 | Bueley et al. ........... 312/334.8 |
| 6,578,939 | B1 | * | 6/2003 | Mayer ..................... 312/334.5 |
| 6,644,480 | B2 | * | 11/2003 | Kaminski ..................... 211/26 |
| 2001/0040203 | A1 | * | 11/2001 | Brock et al. ........... 248/222.11 |
| 2003/0141264 | A1 | * | 7/2003 | Kaminski ..................... 211/26 |
| 2003/0161134 | A1 | * | 8/2003 | Besserer et al. ............ 361/826 |

FOREIGN PATENT DOCUMENTS

DE 101 56 931 A1 * 7/2003 ............ H02B/1/34

* cited by examiner

Primary Examiner—Carl D. Friedman
Assistant Examiner—Jennifer E. Novosad
(74) Attorney, Agent, or Firm—Pauley Petersen & Erickson

(57) ABSTRACT

The invention relates to a universal installation kit, consisting of an installation rail, L- and Z-shaped fastening elbows and/or device-specific installation adapters, by means of which, together with fastening receivers and pairs of fastening bores which are arranged with different horizontal spacings, it is possible to realize installation depths for a multitude of different built-in units of various installation depths and installation positions fastening possibilities.

20 Claims, 4 Drawing Sheets

UNIVERSAL INSTALLATION KIT FOR A BUILT-IN UNIT FOR INSTALLATION IN A RACK

BACKGROUND OF THE INVENTION

1. Field of the Invention

This invention relates to a universal installation kit, having an installation rail and fastening elbows for a built-in unit to be installed in a rack.

2. Description of Related Art

With their rows of fastening receivers in a uniform fastening grid, the vertical frame legs of a rack offer a plurality of fastening locations for an installation rail with horizontal dimensions matched to the distance between occupied vertical frame legs. Different installation rails are known, whose respective fastening bores are matched to defined installation depths of the fastening locations of built-in units. It is thus possible for the installation rails to cover several installation depths of a series of types of built-in units from a particular supplier and manufacturer. However, built-in units from different manufacturers with identical functions also exist, which require different installation depths. As a rule, this is accomplished with particularly assigned installation rails, so that it is necessary to make available a multitude of installation kits if a user wants to have a free selection of built-in units. This applies more if the installation kit requires, in addition to the particular installation rail, particular fastening elbows, and if it is necessary to make available installation rails of different dimensions for installation in different racks.

SUMMARY OF THE INVENTION

It is one object of this invention to provide a universal installation kit including an installation rail and fastening elements, which meets all requirements for the installation of built-in units of different installation depths, from different manufacturers in different racks at different spacings and fastening positions of the vertical frame legs of the racks to be occupied.

In accordance with this invention, this object is attained with an installation kit in which the installation rail can be installed between two vertical frame legs of the rack in the direction of the installation depth and has a horizontally oriented fastening plate, which has a number of rows of aligned fastening bores which are arranged in pairs in the longitudinal direction of the fastening plate at different, predetermined horizontal installation depths of the installation kits, or which can be connected for forming identical or additional installation depths by means of L-shaped and/or Z-shaped fastening elbows and/or device-specific installation adapters. The fastening plate is longer than the maximum installation depth of the built-in unit and has an angled-off fastening flange on at least one end, which is followed by further fastening receivers in the fastening plate which are adapted to different fastening spacings between the vertical frame legs.

A number of installation depths of the commercially offered built-in units can be covered by the rows of fastening bores in the installation rail. Further installation depths and installation positions can be covered with the fastening elbows and device-specific installation adapters. As a rule, this is sufficient for installation units with identical functions from various manufacturers, such as servers. Furthermore, the fastening flanges and fastening receivers of the installation rail take advantage of several installation distances and installation situations in different racks, so that a universally usable installation kit is made available and the multitude of special kits become superfluous. One advantage of the universal installation kit is that the installation rail can be fastened on profiled sides of the frame legs extending vertically and parallel with respect to it, and installation units can be selectively attached to fastening surfaces with predetermined and matched installation depths, which are oriented vertically or parallel with respect to the installation rail. In the process it is possible to set the correct installation depth of the installation connecting points of the built-in unit selected for it.

In accordance with one embodiment, the load-bearing capacity of the installation rail is improved because outside of the fastening receivers the fastening plate of the installation rail is reinforced by beveled edges on its two longitudinal sides.

In accordance with a further embodiment, the fastening flanges of the installation rail, which are preferably angled in the direction of the front, have at least one fastening bracket with a threaded receiver.

If each fastening flange terminates in two fastening brackets, whose spacing is matched to a fastening grid of the frame leg fastening receivers, and the fastening brackets of the fastening flanges of the installation rail are offset outward by the amount of their thickness beyond the outside of the fastening flanges, and their shape is matched to the cross section of the fastening receivers of the frame legs embodied as openings, then it is possible to occupy corresponding fastening receivers of the frame legs and to use the fastening brackets as nuts for the screw connections.

A certain change in the fastening locations of the installation rail and the built-in unit is created because pairs of fastening receivers of the installation rail and pairs of fastening receivers of the fastening elbows or installation adapters are embodied as elongated holes, whose longitudinal dimensions on the installation rail and on the fastening leg of the fastening elbows are oriented vertically or horizontally, even if the rack, the installation rail, the fastening elbows and the installation adapters are laid out in a uniform fastening grid of fastening bores and/or fastening receivers as the built-in units.

The number of installation options can be further increased because the fastening receivers of the fastening plate of the installation rail, together with the rows of fastening bores and/or fastening receivers of the fastening elbows or installation adapters, are also used for fixing further installation depths for the built-in units.

In the simplest way, the connections of this invention replace screw connections.

The parts of the universal installation kit are preferably embodied as punched and bent sheet metal parts.

BRIEF DESCRIPTION OF THE DRAWINGS

This invention is, explained in greater detail in view of exemplary embodiments represented in the drawings, wherein.

DESCRIPTION OF PREFERRED EMBODIMENTS

Figure 1:
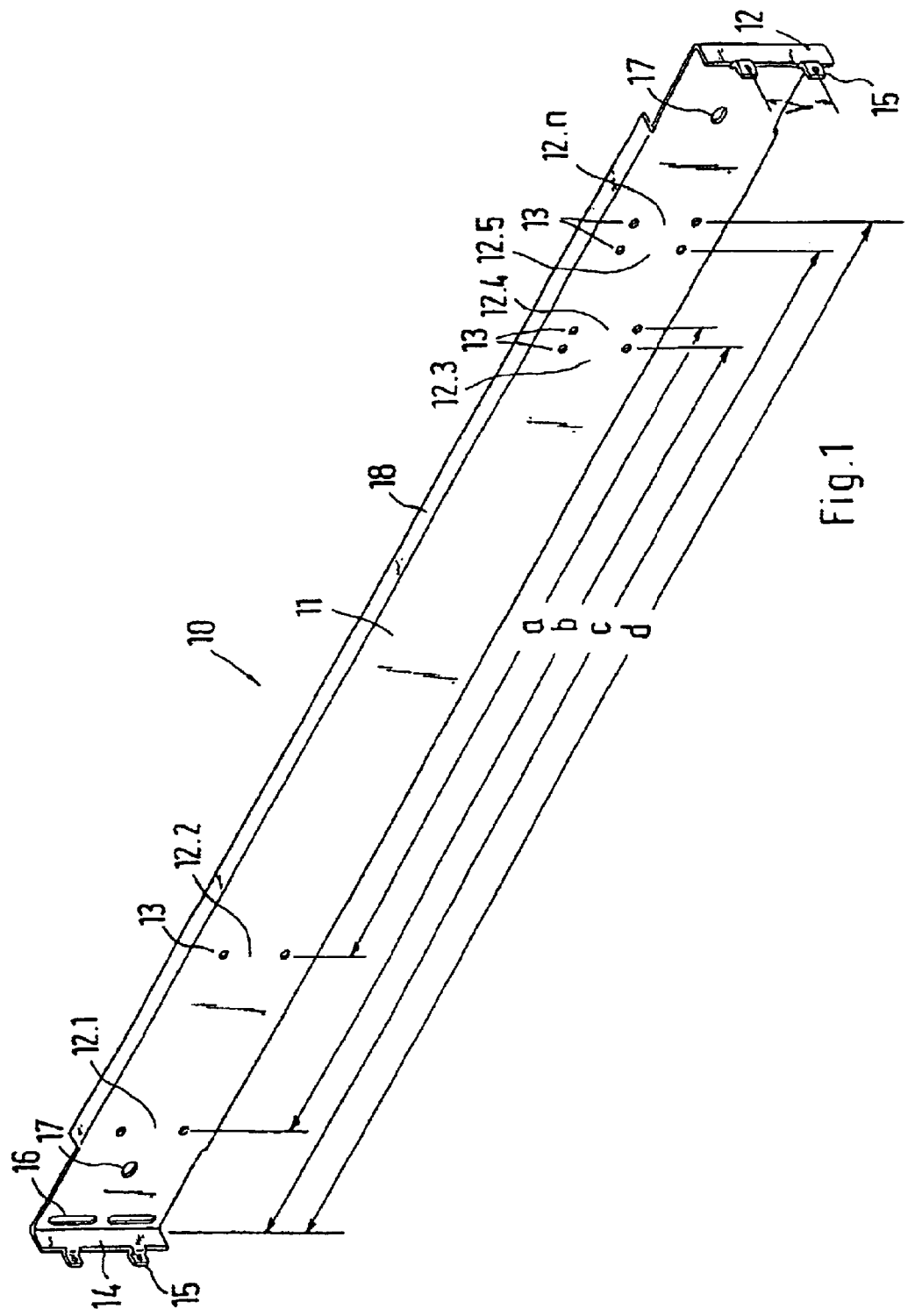
FIG. 1 is a perspective front view of one embodiment of an installation rail.

The installation rail 10 in FIG. 1 substantially includes a narrow fastening plate 11, which at both ends has fastening flanges 14 angled toward the front. Directly following the fastening flanges 14, fastening receivers 16 and 17 are cut into the fastening plate 11, so that the installation rail 10 can be fastened vertically, as well as on profiled sides of the spaced apart vertical frame leg of a rack, which are oriented parallel with the installation rail 10. In this case the fastening flanges 14 can terminate in fastening brackets 15, which have a threaded receiver. In the described embodiments, several fastening locations are preferably matched to a whole number multiple of a commonly employed fastening grid, and that this has all parts which are to be connected with each other.

The fastening flanges 14 and the fastening receivers 16 and 17 permit the attachment at fastening locations of the rack having different predetermined horizontal distances. As shown by the vertical pairs of fastening receiver 16, the installation rail 10 can be displaced in a vertically limited way at the frame legs, because the fastening receivers 16 are embodied as vertical elongated holes. As indicated by the fastening bores 17, only a single fastening screw per side can be sufficient for attaching the built-in units. The fastening bores 17 can also be used for connecting the installation rail 10 at the frame legs.

Figure 2:
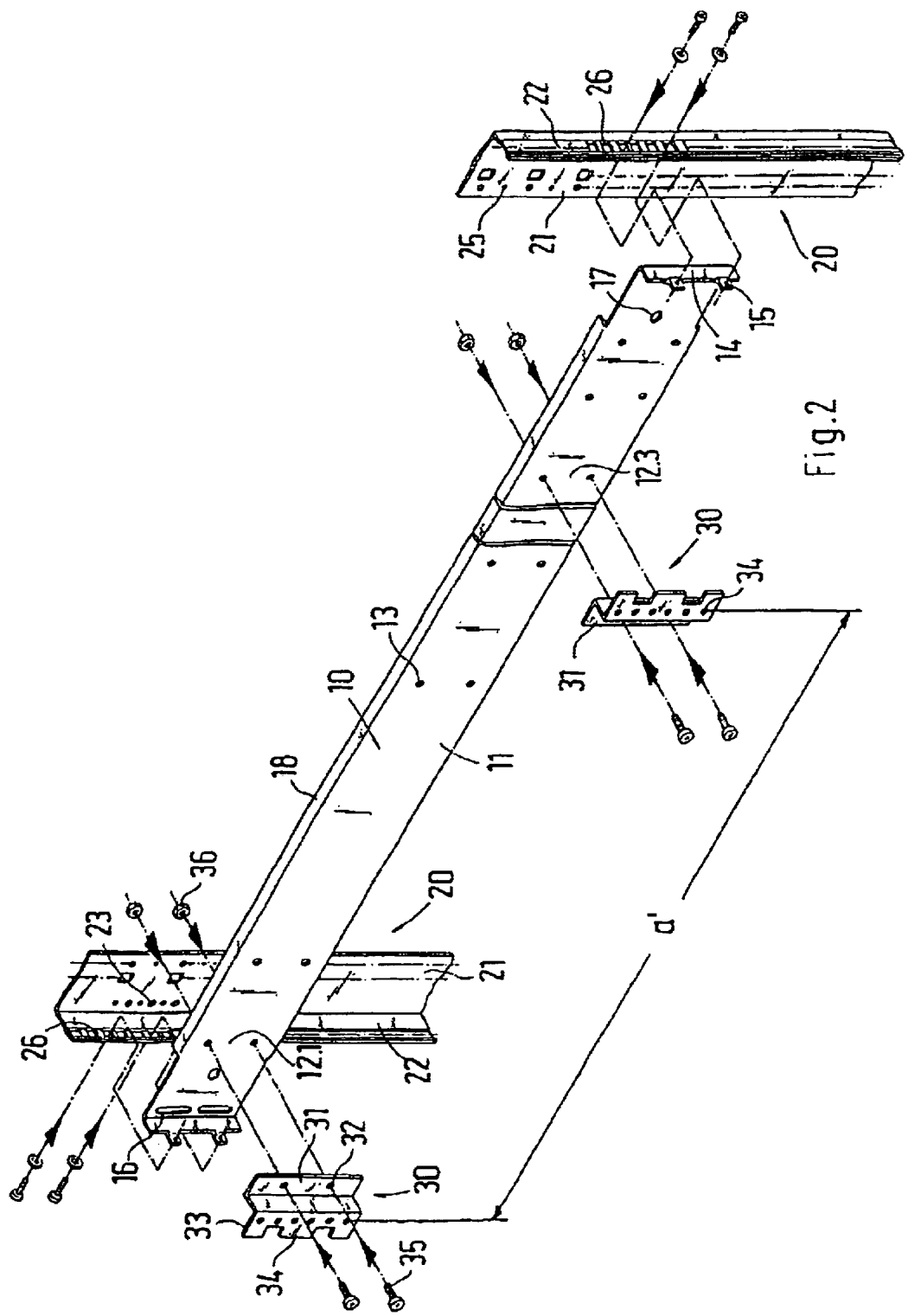
FIG. 2 is an exploded perspective view of an attachment of the installation rail to two differently oriented frame legs, and the achievement of a short installation depth by two Z-shaped fastening elbows.

The shape of the fastening brackets 15 of the fastening flanges 14 is preferably matched to square or rectangular-shaped fastening receivers 26 of vertical frame legs 20 in accordance with FIG. 2. Because they are outwardly offset with respect to the outsides of the fastening flanges 14 by an amount, preferably their own thickness, the fastening receivers 26 of the frame legs 20 can receive the fastening brackets 15 so that the fastening flanges 14 rest against the associated profiled sides of the frame legs 20.

Preferably the fastening plate 11 of the installation rail 10 has a linear dimension which is greater than the maximum installation depth of the built-in units to be fastened. The fastening plate 11 has a number of vertically aligned rows 12.1, 12.2, 12.3, 12.4 and 12.n of pairs of fastening bores 13, which are arranged in pairs at predetermined installation depths a, b, c and d. It can be seen here that the fastening receivers 16 and 17 can also be used for determining requested installation depths, as the installation dimensions c and d show.

The two longitudinal sides of the fastening plate 11 are reinforced outside of the fastening receivers 16 and 17 by beveled edges 18 for improving the load-bearing capacity. Only the end areas 19 are free of the edges 18.

The spacing between the fastening bores 13 of the pairs 12.1 to 12.n, the same as the spacing between the threaded bores of the two fastening brackets 15 of the fastening flanges 14, are matched to the common system fastening grid of the rack and the built-in units. It is within the scope of this invention to set the horizontal spacing of the pairs 12.1 to 12.n of the fastening bores 13 to a separate fastening grid of the built-in units, or to lay them out in accordance with existing installation depths of various commercially available built-in units.

As shown in FIG. 2, through the fastening receivers 16 the installation rail 10 can be screwed together with fastening bores 23 of the leg 21 of the frame leg 20 of a rack. It is possible to use tapping fastening screws 35. The pairs 12.1 and 12.3 of fastening bores 13 of the fastening plate 11 can also be used for the attachment of Z-shaped fastening elbows 30. The fastening elbows 30 can be screwed to the installation rail 10 via the fastening legs 31 with the fastening bores 32 by using fastening screws 35 and nuts 36. The fastening legs 33, which are located parallel with and spaced apart from the fastening plate 11 and are oriented toward the ends of the installation rail 10, have a row of fastening bores 34, which fix an increased installation depth a'. In the process, the fastening surface for the built-in unit remains parallel with the installation rail 10.

Figure 3:
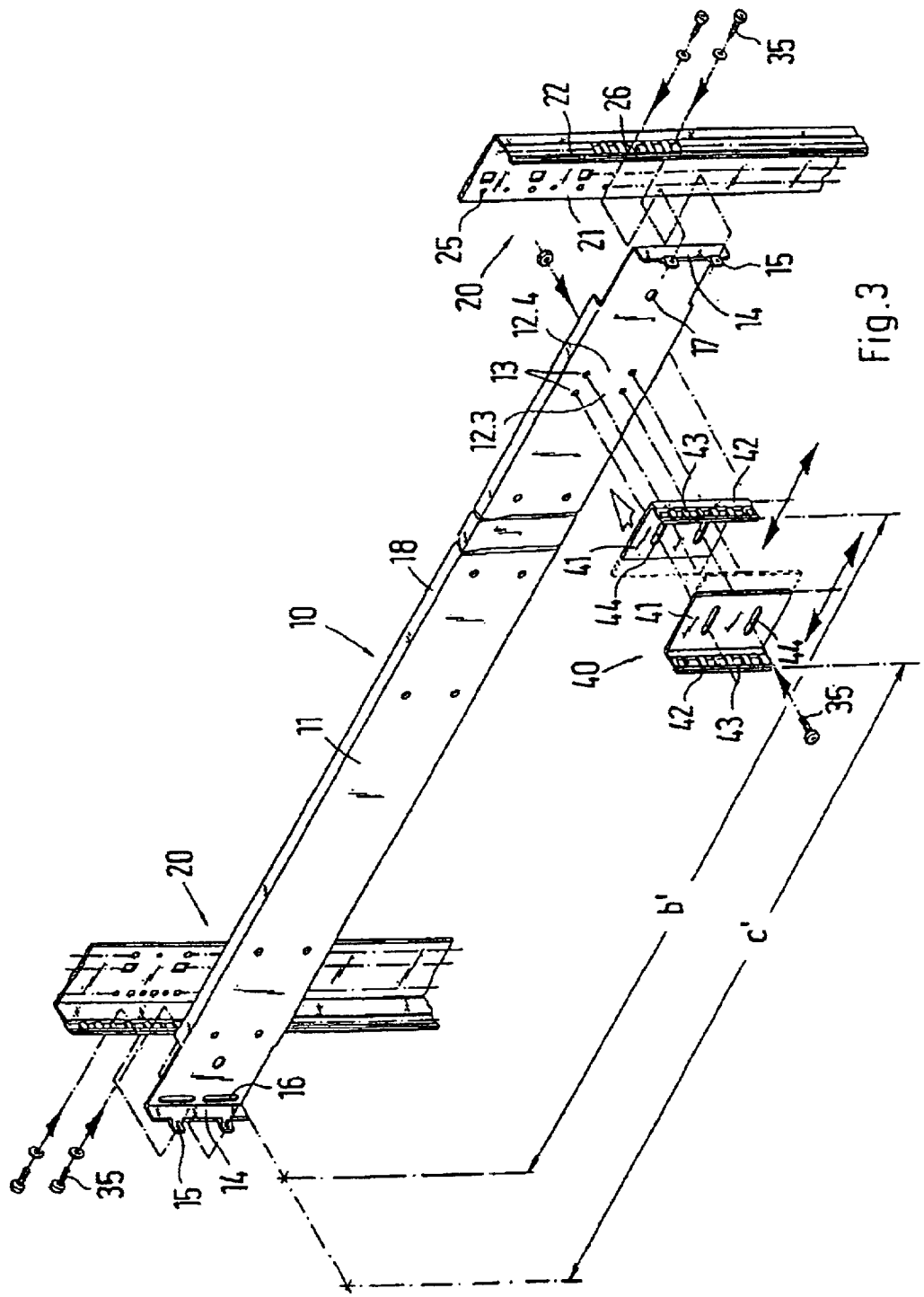
FIG. 3 is an exploded perspective view of an achievement of a larger installation depth by L-shaped fastening elbows, wherein the fastening surfaces for the built-in unit extend vertically with respect to the installation rail.

In the exemplary embodiment in accordance with FIG. 3, L-shaped frame legs 20 are used, the same as in the embodiment shown in FIG. 2. The profiled sides for attaching the installation rail 10 extend vertically with respect to the installation rail 10 and have a row of square fastening receivers 26. The fastening brackets 15 are inserted into flush fastening receivers 26 of the frame legs 20, so that they rest against the facing outsides of the profiled sides of the frame legs 20 which are oriented vertically with respect to the installation rail 10 and can be screwed together with the threaded receivers of the fastening brackets 15 screw connections consisting of fastening screws 35.

The fastening receivers 16 are used on one side of the installation rail 10 for the installation dimensions b' and c', while an L-shaped fastening elbow 40 is connected with the pair 12.3 or 12.4 of fastening bores 13. During this a limited displacement of the fastening elbow 40 in the longitudinal direction of the installation rail 10, and therefore also the installation depth b' and c', is achieved by the fastening leg 41 with the horizontally oriented elongated holes 44 as the fastening receivers. As shown by the example of the fastening elbow 40, the fastening leg 42 for attaching the built-in unit can face either the right or the left end of the installation rail 10. In this case the fastening leg 42 extends vertically with respect to the fastening plate 11 and in this way offers, together with the fastening receivers 43, a fastening surface extending vertically with respect to the longitudinal direction of the installation rail 10. As the exemplary embodiment shows, if a Z-shaped, as well as an L-shaped fastening elbow 30 and 40 are employed, the two fastening locations for the built-in unit can also be distributed on fastening surfaces which are differently oriented toward the installation rail 10.

The number of fastening receivers 18 and 17, as well as of the pairs 12.1 to 12.n is not limited to the exemplary embodiments shown. The fastening surface 11, of the installation rail 10 can be easily expanded to new installation depths of built-in units, so that there is an increasing number of installation options for different built-in units.

Figure 4:
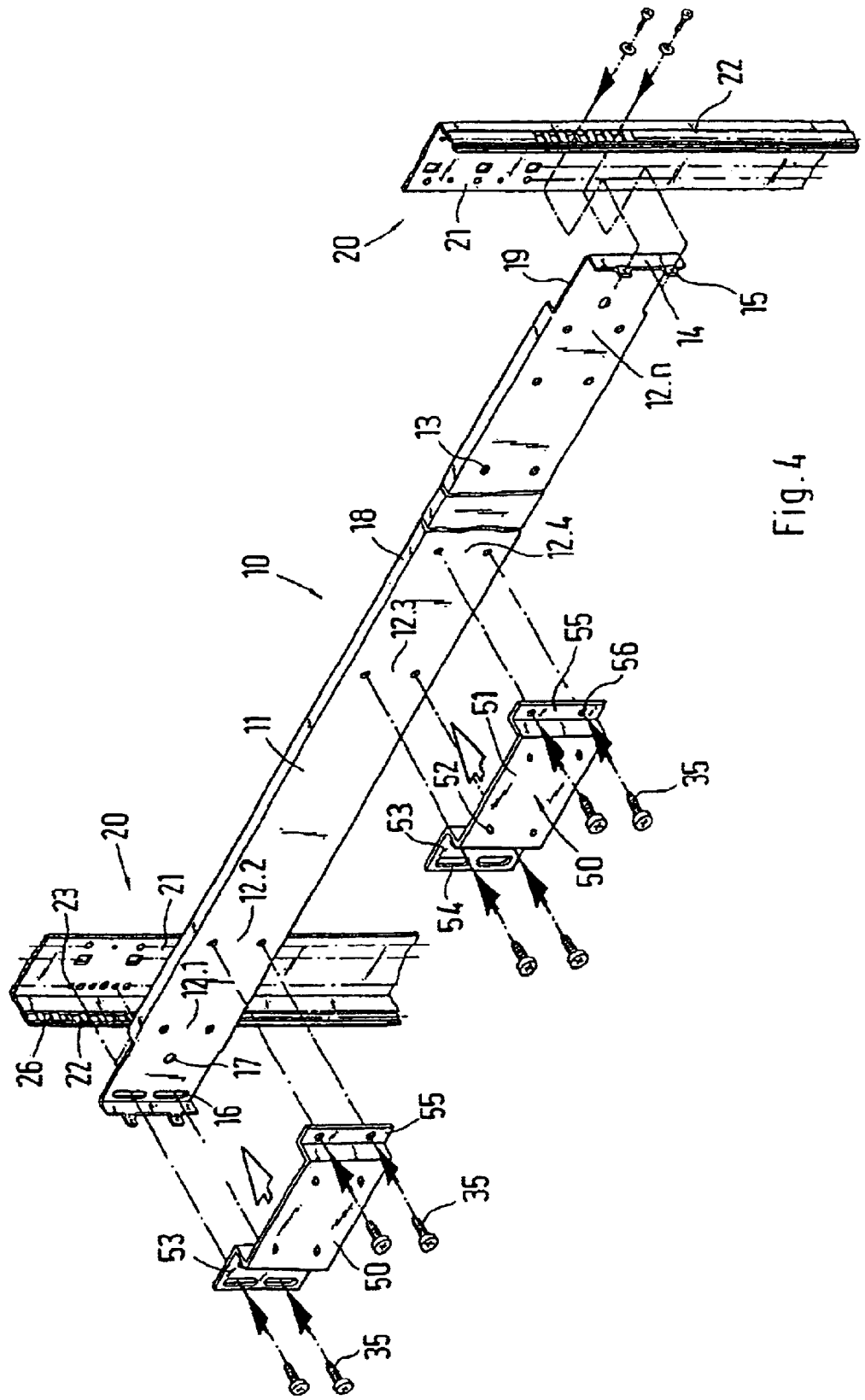
FIG. 4 is an exploded perspective view of an installation for variable installation depths with fastening surfaces oriented parallel with respect to the installation rail, wherein the fastening receivers for attaching the installation rail to the frame legs are included for achieving a defined installation depth.

In the embodiment shown in FIG. 4, the installation rail 10 is screwed together via the fastening receivers 16 with fastening bores 23 in the leg 21 of the frame leg 20, as shown by the tapping screws 35. In the process, the fastening leg 53 of a device-specific installation adapter 50 is screwed on at the same time, in which case the vertical elongated holes 54 are used. The other fastening leg 55 with the fastening bores 56 is screwed together at the pair 12.2 of bores 13 of the installation rail 10. The fastening brackets 15 of the fastening flange 14 can be fixed in fastening receivers 26 of the fastening leg 22 of the frame leg 20. The device-specific installation adapter 50 forms a fastening plate 51 with fastening bores 52 for the built-in unit and extends parallel with respect to the installation rail 10, such as in the installation depth of the rack. A further installation adapter 50 is connected, for example with the pairs 12.3 and 12.4 of bores 13, for fastening the built-in unit. This depends on the installation depth of the fastening locations for the device.

New installation possibilities with new installation depths can be provided with further pairs of bores 13 in the fastening plate 11.

The fastening elbows 30 and 40 and the installation adapter 50 can be matched in tiers to various built-in units so that nevertheless a uniform front of the installed built-in units is achieved. With the installation adapters 50 it is possible via the distance of the fastening plate 51 from the installation rail 10 to change to the installation width for the built-in unit. This applies of course also to the fastening legs 34 of the fastening elbows 30 and the width of the fastening leg 42 of the fastening elbows 40.

The fastening legs 53 and 55 of the installation adapters 50 are beveled at facing sides in an L-shape at the fastening plate 51.

A universal installation kit is created by the installation rail 10, the fastening elbows 30 and 40, as well as the device-specific installation adapters 50, by means of which the installation depths of different built-in units can be covered, so that it is possible to install the fronts of built-in units, whose height is matched to standardized height units, for example 2 HE, flush in a rack, in spite of different installation depths and installation conditions.

German Patent Reference 101 56 931.9, the priority document corresponding to this invention, and its teachings are incorporated, by reference, into this specification.

What is claimed is:

1. A universal installation kit for installing a built-in unit to vertical frame legs of a rack, the universal installation kit comprising: an installation rail (10) positionable between two of the vertical frame legs (20 and 25, 20.1 and 25.1) of the rack in a depth direction, the installation rail (10) including a horizontally oriented fastening plate (11) with a plurality of rows (12.1 to 12.n) of aligned fastening bores (13) in a longitudinal direction of fastening plate (11), each of the plurality of rows (12.1 to 12.n) of aligned fastening bores disposed at a different predetermined horizontal installation depth (a, b, c, d) of the installation kit, at least one of an L-shaped fastening elbow (40), a Z-shaped fastening elbow (30) or a device-specific installation adapter (50) connected to the installation rail (10) at one of the plurality of rows (12.1 to 12.n) of aligned fastening bores (13) for forming an additional installation depth (a', b', c'), the fastening plate (11) having an angled-off fastening flange (14) on at least one end and a plurality of fastening receivers (16, 17) for connecting the installation rail (10) to one of the vertical frame legs (20), the rows (12.1 to 12.n) of the fastening bores (13) of the fastening plate (11) each comprising at least two of the fastening bores (13), and a fastening leg (31, 33, 41, 42, 53, 55) of one of the fastening elbows (30, 40) or the installation adapters (50) having one of fastening bores (32, 34, 56) and second fastening receivers (43, 44, 54) matched to the fastening bores (13) of one of the rows (12.1 to 12.n) or the fastening receives (16, 17).

2. The universal installation kit in accordance with claim 1, wherein the fastening plate (11) has a beveled edge (18) on each of two longitudinal sides of the installation rail (10).

3. The universal installation kit in accordance with claim 2, wherein the fastening flange (14) is angled and has at least one fastening bracket (15) with a threaded receiver.

4. The universal installation kit in accordance with claim 3, wherein the fastening flange (14) terminates in two fastening brackets (15) spaced to match fastening receivers (26) of one of the vertical frame legs (20).

5. The universal installation kit in accordance with claim 4, wherein each of the fastening brackets (15) of the fastening flanges (14) of the installation rail (10) is offset outward by an amount equal to a thickness of one of the fastening brackets (15) beyond an outside surface of a corresponding one of the fastening flanges (14), and has a shape corresponding to a cross section of one of the fastening receivers (26) of the vertical fame legs (20).

6. The universal installation kit in accordance with claim 5, wherein pairs of the fastening receivers (16) of the installation rail (10) and pairs of second fastening receivers (44, 54) disposed in the one of the fastening elbows (40) and the installation adapters (50) are formed as elongated holes that are oriented one of vertically and horizontally.

7. The universal installation kit in accordance with claim 6, wherein the fastening receivers (16) of the fastening plate (11) of the installation rail (10), the rows (12.1 to 12.n) of the fastening bores (13), and the fastening receivers (34, 44, 52) of the fastening elbows (30, 40) or the installation adapters (50) also used for fixing the installation depths (b', c') of the built-in units.

8. The universal installation kit in accordance with claim 7, wherein the installation rail (10) and the fastening elbows (30, 40) are punched and bent sheet metal parts.

9. The universal kit in accordance with claim 8, wherein the one of the fastening elbows (30, 40) and the installation adapters (50) is screwed together with the installation rail (10).

10. The universal installation kit in accordance with claim 9, wherein the installation rail (10) is screwed together with the two of the vertical frame legs (20) which are spaced apart.

11. The universal installation kit in accordance with claim 10, wherein each of the installation adapters (50) comprises a device fastening plate (51) with fasting legs (53, 55) beveled in an L-shape on two sides.

12. The universal installation kit in accordance with claim 1, wherein the fastening flange (14) is angled and has at least one fastening bracket (15) with a threaded receiver.

13. The universal installation kit in accordance with claim 12, wherein the fastening flange (14) terminates in two fastening brackets (15) spaced to match fastening receivers (26) of one of the vertical frame legs (20).

14. The universal installation kit in accordance with claim 13, wherein each of the fastening brackets (15) of the fastening flanges (14) of the installation rail (10) is offset outward by an amount equal to a thickness of one of the fastening brackets (15) beyond an outside surface of a corresponding one of the fastening flanges (14), and has a shape corresponding to a cross section of one of the fastening receivers (26) of the frame legs (20).

15. A universal installation kit for installing it built-in unit to vertical frame legs of a rack, the universal installation kit comprising: an installation rail (10) and positionable between two of the vertical frame legs (20 and 25, 20.1 and 25.1) of the rack in a depth direction, the installation rail (10) including a horizontally oriented fastening plate (11) with a plurality of rows (12.1 to 12.n) of aligned fastening bores (13) in a longitudinal direction of the fastening plate (11), each of the plurality of rows (12.1 to 12.n) of aligned fastening bores disposed at a different predetermined horizontal installation depth (a, b, c, d) of the installation kit, at least one of an L-shaped fastening elbow (40), a Z-shaped fastening elbow (30) or a device-specific installation adapter (50) connected to the installation rail (10) at one of the plurality of rows (12.1 to 12.n) of aligned fastening bores (13) for forming an additional installation depth (a', b', c'), the fasting plate (11) having an angled-off fastening flange (14) on at least one end and a plurality of fastening receivers (16, 17) for connecting the installation rail (10) to one of the vertical frame legs (20), and pairs of the fastening receivers (16) of the installation rail (10) and pairs of second fastening receivers (44, 54) of the one of the fastening elbows (40) or the installation adapters (50) formed as elongated holes that are oriented one of vertically and horizontally.

16. The universal installation kit in accordance with claim 15, wherein the fastening receivers (16) of the fastening plate (11) of the installation rail (10), and the rows (12.1 to 12.n) of the fastening bores (13), and the fastening receivers (34, 44, 52) of the fastening elbows (30, 40) or the installation adapters (50) are also used for fixing the installation depths (b', c') of the built-in units.

17. The universal installation kit in accordance with claim 15, wherein the installation rail (10) and the fastening elbows (30, 40) are punched and bent sheet metal parts.

18. The universal installation kit in accordance with claim 15, wherein the one of the fastening elbows (30, 40) and the installation adapters (50) is screwed together with the installation rail (10).

19. The universal installation kit in accordance with claim 15, wherein the installation rail (10) is screwed together with the two of the vertical frame legs (20) which are spaced apart.

20. The universal installation kit in accordance with claim 15, wherein each of the installation adapters (50) comprises a device fastening plate (51) with fastening legs (53, 55) beveled in an L-shape on two sides.

* * * * *